United States Patent
Kojima et al.

Patent Number: 6,118,648
Date of Patent: Sep. 12, 2000

[54] NON-REDUCING DIELECTRIC CERAMIC MATERIALS

[75] Inventors: Takashi Kojima; Akira Sato; Naoto Oji; Takeshi Nomura, all of Chiba, Japan

[73] Assignee: TDK Corporation, Tokyo, Japan

[21] Appl. No.: 09/048,041

[22] Filed: Mar. 26, 1998

[30] Foreign Application Priority Data

Mar. 31, 1997 [JP] Japan .................................. 9-096733

[51] Int. Cl.$^7$ .................................................. H01G 4/06
[52] U.S. Cl. ........................................... 361/311; 361/321.5
[58] Field of Search ............ 361/311–313, 321.1–321.5; 501/134, 136, 137, 138, 139

[56] References Cited

U.S. PATENT DOCUMENTS

| | | | |
|---|---|---|---|
| 5,248,640 | 9/1993 | Sano et al. | 501/137 |
| 5,264,402 | 11/1993 | Sano et al. | 501/137 |
| 5,319,517 | 6/1994 | Nomura et al. | 361/321.4 |
| 5,733,832 | 3/1998 | Kawamoto et al. | 501/136 |
| 5,759,934 | 6/1998 | Matoba | 501/134 |
| 5,790,367 | 8/1998 | Mateika et al. | 501/134 |
| 5,801,111 | 9/1998 | Wada et al. | 501/138 |
| 5,840,642 | 11/1998 | Kim et al. | 501/136 |
| 5,841,625 | 11/1998 | Hennings et al. | 361/321.4 |

FOREIGN PATENT DOCUMENTS

| | | |
|---|---|---|
| 61-144813 | 7/1986 | Japan . |
| 5-217426 | 8/1993 | Japan . |

*Primary Examiner*—Kristine Kincaid
*Assistant Examiner*—Anthony Dinkins
*Attorney, Agent, or Firm*—Oblon, Spivak, McClelland, Maier & Neustadt, P.C.

[57] ABSTRACT

A non-reductive dielectric ceramic material having a main component represented by $[(Ca_XSr_{1-X})O]_m[(Ti_YZr_{1-Y})O_2]$ wherein X, Y and m fulfills $0 \leq X \leq 1$, $0 \leq Y \leq 0.10$ and $0.75 \leq m \leq 1.04$, and auxiliary component containing 0.2–5 mol % (calculated MnO) of Mn oxide, 0.1–10 mol % (calculated as $Al_2O_3$) of Al oxide and 0.5–15 mol % of a component of formula $[(Ba_ZCa_{1-Z})O]_V SiO_2$ wherein $0 \leq Z \leq 1$ and $0.5 \leq V \leq 4.0$; and when used in a laminated ceramic condenser using a base metal such as Ni as inner electrode, can be sintered at a temperature not exceeding 1,300° C., shows a small temperature coefficient of capacitance, can be controlled arbitrarily in the range of −150 to +150 ppm/° C., has a specific resistance of no less than $1 \times 10^{13}$ Ωcm at 25° C., displays a small frequency-dependence of dielectric constant and dielectric loss tangent (tan δ) and has a long accelerated lifetime of insulating resistance.

8 Claims, 3 Drawing Sheets

NON-REDUCING DIELECTRIC CERAMIC MATERIALS

BACKGROUND OF THE INVENTION

1. Field of the Invention

The present invention relates to a laminated ceramic condenser, and more particularly to a dielectric ceramic material for compensation of temperature used in a laminated ceramic condenser using a base metal as an inner electrode.

2. Background Art

Laminated ceramic condensers are widely used as electronic part of small size, high capacity and high reliability, and a large number of laminated ceramic condensers are used in one electronic device. With the recent tendency of miniaturizing the size of devices and enhancing the performances thereof, there is an increasing desire for further miniaturized size, enhanced capacity, lowered price and improved reliability of laminated ceramic chip condensers.

Usually, a laminated ceramic condenser is manufactured by laminating an inner electrode layer paste and a dielectric layer paste by the method of sheeting or printing and sintering them simultaneously.

When the dielectric materials which have been used in prior laminated ceramic condensers are sintered in a reductive atmosphere, they are reduced to give a semiconductor. Thus, a noble metal such as Pd has been used as a material of inner electrode, because such a noble metal does not melt at the sintering temperature of dielectric ceramics and is not oxidized even if sintered under a high oxygen partial pressure enough to prevent the conversion of dielectric ceramics into semiconductor. However, noble metals such as Pd are expensive, which has obstructed the reduction of cost and enhancement of capacity of laminated ceramic condensers.

Currently, the use of relatively inexpensive base metals such as Ni and Ni alloys is being studied. If a base metal is used as the conductive material of inner electrode layer, the inner electrode layer is oxidized when sintered in the atmospheric air. Accordingly, the simultaneous sintering of dielectric layer and inner electrode layer must be carried out in a reductive atmosphere. However, if sintering is carried out in a reductive atmosphere, the dielectric layer is reduced as has been mentioned above and thereby the specific resistance is lowered. Thus, non-reductive dielectric materials have been proposed.

Laminated ceramic condensers using a non-reductive dielectric material, however, is disadvantageous in that lifetime of insulating resistance (IR) is shortened and reliability is deteriorated when the thickness of dielectric layer is decreased to 5 μm or less.

As non-reductive dielectric ceramic material, JP-A-126117/1988, JP-A-289709/1988 and JP-A-217426/1993 have disclosed those prepared by adding silica, lithium glass, lithium silicate+alkaline earth fluoride, boron-lithium glass and the like to a (CaSr) (TiZr)O$_3$ type dielectric ceramic composition so as to make possible a simultaneous sintering with a base metal such as Ni, Cu or the like.

However, the dielectric ceramic condensers using the aforesaid material are disadvantageous in that:

(1) those prepared by adding Li type glass or CaF+Li$_2$SiO$_3$ type glass show a frequency dependence in dielectric constant and dielectric loss tangent (tan δ), and especially marked increases in dielectric constant and dielectric loss tangent are observed at a high temperature exceeding 100° C. and at a low frequency of several hundreds Hz. Further, those prepared by adding Li glass are short in the accelerated lifetime of IR and low in reliability when the dielectric layer is made into a thin layer;

(2) those prepared by adding SiO$_2$ are short in the accelerated lifetime of insulating resistance and low in reliability when thickness of dielectric layer is decreased; etc.

In addition, it is required currently to develop a dielectric ceramic composition for compensation of temperature having a small temperature-response of capacitance and controllable arbitrarily in the range of −150 to +150 ppm/° C., and it is necessary today to develop a ceramic material capable of providing such a controllable condenser having a low temperature constant.

SUMMARY OF THE INVENTION

It is an object of the present invention to provide a highly reliable non-reductive dielectric ceramic material for use in a laminated ceramic condenser using a base metal such as Ni or the like as an electrode, which can be sintered at a temperature not exceeding 1,300° C., shows a small temperature coefficient of capacitance, can be controlled arbitrarily in the range of −150 to +150 ppm/° C., has a specific resistance of at least 1×10$^{13}$ Ωcm at 25° C., displays small frequency-dependence of dielectric constant and dielectric loss tangent (tan δ), and shows a long accelerated lifetime of insulating resistance even if thickness of insulating layer is decreased.

The object mentioned above can be achieved by either of the following constructions (1) to (8):

(1) A non-reductive dielectric ceramic material comprising a main component and auxiliary components, wherein when said main component is represented by the following formula:

$[(Ca_XSr_{1-X})O]_m[(Ti_YZr_{1-Y})O_2]$

X, Y and m are in the following ranges:
0≦X≦1,
0≦Y≦0.10, and
0.75≦m≦1.04 and said auxiliary components are 0.2 to 5 mol % per said main component of Mn oxide, calculated as MnO, 0.1 to 10 mol % per said main component of Al oxide calculated as Al$_2$O$_3$, and 0.5 to 15 mol % per said main component of a component represented by the following formula:

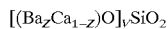
$[(Ba_ZCa_{1-Z})O]_V SiO_2$ in which Z and V are in the following ranges:
0≦Z≦1, and
0.5≦V≦4.0.

(2) The non-reductive dielectric ceramic material of Paragraph (1), which further contains at least one oxide of rare earth elements (La, Ce, Pr, Nd, Sm, Eu, Gd, Tb, Dy, Ho, Er, Tm, Yb and Lu) including Sc and Y or Nb, Mo, Ta and Ti in an amount of 0.02 to 1.5 mol %.

(3) The non-reductive dielectric ceramic material of Paragraph (1) or (2), wherein the sintering temperature is not higher than 1,300° C.

(4) The non-reductive dielectric ceramic material of any one of Paragraphs (1) to (3), wherein the mean crystal grain diameter is not greater than 3 μm.

(5) A laminated ceramic condenser having the non-reductive dielectric ceramic material of any one of Paragraphs (1) to (4) as a dielectric material.

(6) The laminated ceramic condenser of Paragraph (5), wherein difference between temperature coefficient τC of capacitance determined from C25 (capacitance at 25° C. at 1 MHz) and C125 (capacitance at 125° C. at 1 MHz) according to:

$$\tau C(ppm/° C.)=\{(C125-C25)/C25\}\times\{1/(125-25)\}\times 10^6$$

and capacitance change rate ΔC/C (ppm/° C.) determined from the capacitance change rate at 125° C. at 100 Hz based on the temperature response of capacitance at 1 MHz at 25° C. is within ±30.

(7) The laminated ceramic condenser of Paragraph (5) or (6), wherein the accelerated lifetime until insulating resistance (IR) reaches $2\times10^5\Omega$ or less under a direct current electric field of 70V/μm at 200° C. is no less than 100 hours.

(8) The laminated ceramic condenser of any one of Paragraphs (5) to (7), which has an inner conductor containing at least nickel.

DESCRIPTION OF PREFERRED EMBODIMENTS

Figure 1:
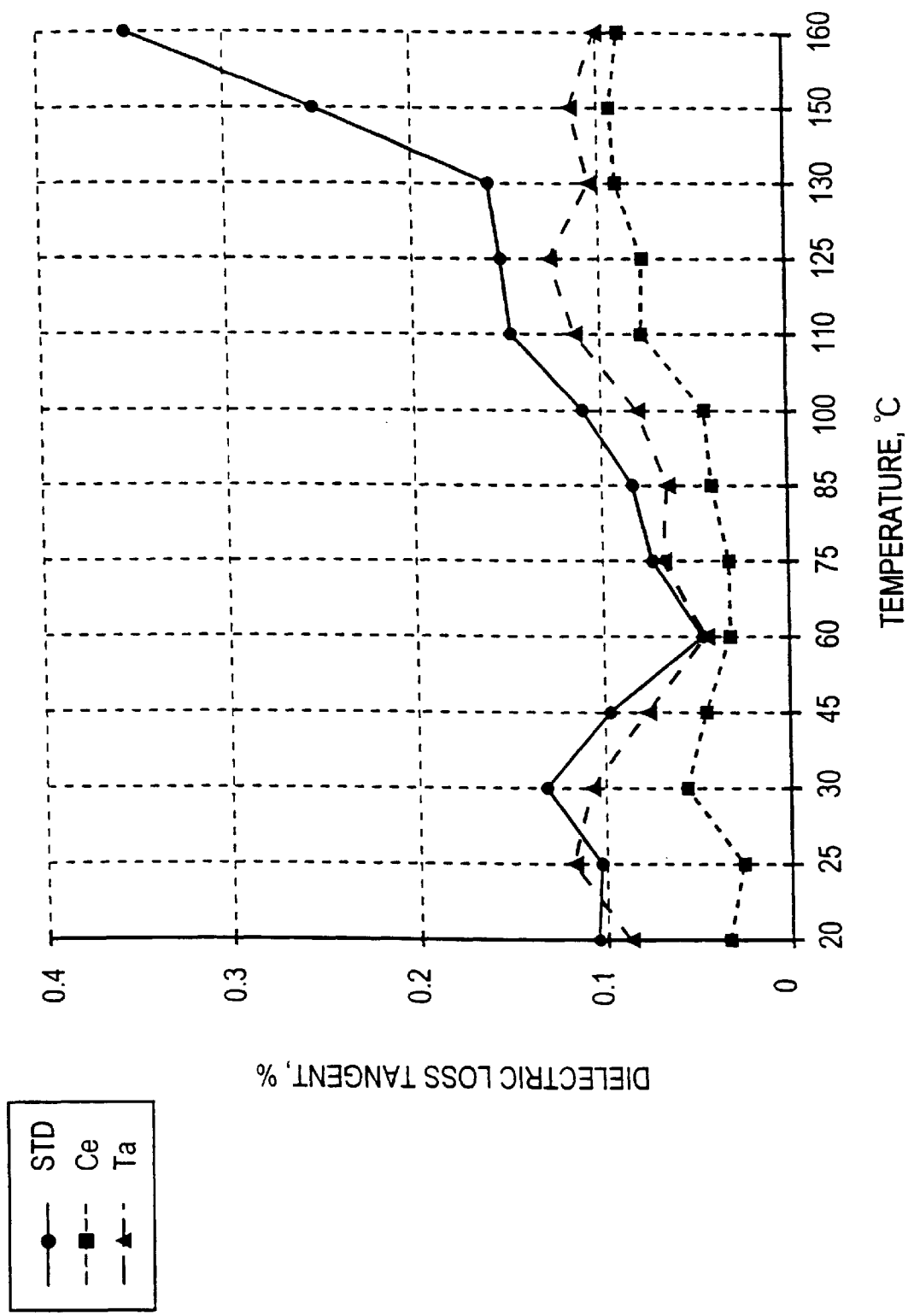
FIG. 1 is a graph illustrating the relation between minute additives and temperature-dependence of dielectric loss tangent at 100 Hz.

Next, concrete construction of the present invention is mentioned below in detail.

The dielectric ceramic material of the present invention comprises a main component and auxiliary components, wherein when said main component is represented by the following formula:

$$[(Ca_XSr_{1-X})O]_m[(Ti_YZr_{1-Y})O_2]$$

X, Y and m are in the following ranges:

0≦X≦1,

0≦Y≦0.10, and 0.75≦m≦1.04 and said secondary components consist of 0.2 to 5 mol % per said main component of Mn oxide calculated as MnO, 0.1 to 10 mol % per said main component of Al oxide calculated as $Al_2O_3$, and 0.5 to 15 mol % per said main component of a component represented by the following formula:

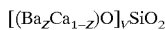

$$[(Ba_ZCa_{1-Z})O]_VSiO_2$$

in which Z and V are in the following ranges:

0≦Z≦1, and 0.5≦V≦4.0.

In the main component, the value of X is in the following range:

0≦X≦1.

That is to say, the main component may be constituted of any of Ca and Sr only, and mixing ratio between Ca and Sr may be arbitrarily selected though preferable value of the mixing ratio is dependent on relation with Y.

In the main component, the value of Y is in the following range:

0≦Y≦0.10 and preferably in the following range:

0≦Y≦0.07

If the value of Y in the main component exceeds 0.10, frequency dependence of capacitance and tan δ becomes great.

In the main component, the value of m is in the following range:

0.75≦m≦1.04.

If the value of m is smaller than 0.75, frequency dependence of capacitance and tan δ is great. If the value of m is greater than 1.04, the material becomes difficult to sinter at a temperature not exceeding 1,300° C.

Of the auxiliary components, Mn oxide is added for the purpose of giving a resistance to reduction and as a sintering aid. As calculated as MnO, the amount of the Mn oxide is 0.2 to 5 mol %, and preferably 0.2 to 3 mol %. If the amount of the Mn oxide is too small, sintering characteristics become deteriorated. If the amount of Mn oxide becomes too large, temperature responses of dielectric constant and capacitance and frequency dependence of dielectric loss tangent (tan δ) become great.

Of the auxiliary components, the Al oxide is added for the purpose of giving the material a resistance to reduction and as a sintering assistant. As calculated as $Al_2O_3$, its amount is 0.1 to 10 mol %, preferably 0.1 to 5 mol %, and further preferably 0.2 to 0.5 mol %. If its amount is too small, specific resistance and sintering characteristics become not good. If its amount is too large, specific dielectric constant becomes low.

Of the auxiliary components, barium/calcium silicate $[(Ba_ZCa_{1-Z})O]_VSiO_2$ is added as a sintering aid.

The values of Z and V are in the following ranges, respectively:

0≦Z≦1, 0.5≦V≦4.0 and preferably in the following ranges:

0.5≦Z≦1, 0.55≦V≦3.0.

If V is smaller than 0.5, the accelerated lifetime of IR becomes short when thickness of dielectric layer is smaller than 5 μm. If V exceeds 4.0, sintering characteristics become not good. The amount of $[(Ba_ZCa_{1-Z})O]_VSiO_2$ is 0.5 to 15 mol %, and preferably 0.1 to 5 mol %. If the amount of $[(Ba_ZCa_{1-Z})O]_VSiO_2$ is smaller than 0.5 mol %, sintering characteristics become not good. If its amount is larger than 15 mol %, sintering is disturbed.

In addition to the aforesaid main component and auxiliary components, at least one oxide of rare earth elements (La, Ce, Pr, Nd, Pm, Sm, Eu, Gd, Tb, Dy, Ho, Er, TM, Yb and Lu) including Sc and Y or Nb, Mo, Ta and W is preferably added. By the addition of these oxides, the temperature coefficient of capacitance and frequency dependence of dielectric loss tangent can be decreased. Amount of the oxide added is 0.02–1.5 mol %, and preferably 0.10–1.0 mol % based on the main component. If the amount of the oxide is too large, the sintering temperature becomes too high. If the amount of the oxide is too small, the effect of decreasing the temperature response of capacitance and frequency dependence of dielectric loss tangent becomes small. The values of mol % mentioned above are all those calculated as $ScO_{3/2}$, $YO_{3/2}$, $LaO_{3/2}$, $CeO_2$, $PrO_{11/6}$, $NdO_{3/2}$, $SmO_{3/2}$, $EuO_{3/2}$, $GdO_{3/2}$, $TbO_{3/2}$, $DyO_{3/2}$, $HoO_{3/2}$, $ErO_{3/2}$, $TmO_{3/2}$, $YbO_{3/2}$, $LuO_{3/2}$, $NbO_{5/2}$, $MoO_3$, $TaO_{5/2}$ and $WO_3$, respectively. Although all these oxides aforementioned are usually present in stoichiometric quantities, composition ratios somewhat deviating from the stoichiometric ratio are also allowable.

As the inner conductor used in combination with the dielectric ceramic material of the present invention, nickel and nickel alloys are preferred. As the nickel alloy, alloys formed between Ni and at least one member selected from the group consisting of Mn, Cr, Co and Al are preferred. Of these preferable nickel alloys, those having a nickel content of 95% by weight or more are particularly preferred.

When the non-reductive dielectric ceramic material of the present invention is applied to capacitance devices such as capacitor and the like, a greater value of dielectric constant ∈ is more desirable. For instance, under a condition of 1 KHz, 1 Vrms at 25° C., ∈ is preferably 28 or more, further preferably 30 or more and particularly preferably 33 or more. A small dielectric constant is disadvantageous from the viewpoint of miniaturizing a capacitance device and enhancing its capacity. Specific resistance $\rho$ (Ωcm) is preferably $1\times10^{13}$ Ω·cm or more and further preferably $1\times10^{14}$ Ω·cm or more, at 25° C. If the specific resistance is too low, loss tends to increase. Specific resistance $\rho$ can be determined from the resistance after applying a DC voltage for a predetermined period of time at a constant temperature.

The temperature coefficient of capacitance τC can be defined according to the following equation:

$$\tau C(ppm/°C.) = \{(C125-C25)/(C25)\} \times \{1/(125-25)\} \times 10^6$$

wherein C25 is capacitance at 25° C. and C125 is capacitance at 125° C., both at 1 MHz. Capacitance change rate ΔC/C (ppm/° C.) was determined from the value of capacitance at 100 Hz, 125° C., taking the temperature coefficient of capacitance at 1 MHz at 25° C. for example as standard. A capacitance change rate closer to temperature coefficient of capacitance at 1 MHz is more desirable, and the difference between them is preferably no more than ±30 and particularly preferably no more than ±15. If the difference between temperature response of capacitance τC and capacitance change rate ΔC/C is great, capacitance greatly changes with frequency and there arises an undesirable change of working in circuit or deficient working, especially when used in a circuit requiring a high accuracy of capacitance.

As to accelerate lifetime of insulating resistance (IR), a longer lifetime is more desirable. For instance, when an acceleration test is carried out at 200° C. in a direct current field of 70 V/μm, the period of time required for reaching a resistance (IR) of below $2\times10^5$Ω is preferably 100 hours or more, further preferably 200 hours or more, and particularly preferably 300 hours or more.

In the non-reductive dielectric ceramic material of the present invention, the mean crystal grain size is preferably 3 μm or less, further preferably 2.5 μm or less, and particularly preferably 1.5 μm or less. Although lower limit thereof is not critical, it is usually about 0.1 μm. If mean grain size of crystal exceeds 3 μm, accelerated lifetime of IR tends to become short and reliability tends to decrease, when thickness of dielectric layer in laminated ceramic condenser is 5 μm or less.

Next, a method for producing a laminated ceramic condenser using the non-reductive dielectric ceramic material of the present invention will be mentioned.

As the starting materials, main component materials such as $CaTiO_3$, $SrTiO_3$, $CaSrO_3$, $SrZrO_3$ etc. all synthesized by hydrothermal process or the like are used in combination with secondary component materials such as $MnCO_3$, $Al_2O_3$, $BaCO_3$, $CaCO_3$, $SrCO_3$, $ZrO_2$, $TiO_2$, $SiO_2$, and oxides of Sc, Y, La, Ce, Pr, Nd, Sm, Eu, Gd, Tb, Dy, Ho, Er, Tm, Yb, Lu, Nb, Mo, Ta, W, etc. Otherwise, a dry synthesis in which a mixture of the above-mentioned main component material and auxiliary component materials are calcined and made to react in solid phase may also be adopted.

The powders mentioned above are weighed out so that the final formulation falls in the ranges defined in the present invention, and mixed with an organic vehicle to prepare a dielectric paste. The binder used in the organic vehicle is not critical, but it may be appropriately selected from various binders such as ethyl cellulose and the like. The organic solvent is not critical, but it may be appropriately selected in accordance with the method of lamination such as printing method, sheeting method, etc. Organic solvents usable include, for example, terpineol, butyl carbitol, acetone, toluene, etc. As the inner electrode, the aforesaid conductive metals or alloys are used. An inner electrode material paste is prepared by kneading these metals with the aforesaid organic paste. An outer electrode paste can also be prepared in the same manner as above.

When printing method is used, a dielectric paste and an inner electrode material paste are laminated and printed onto a substrate made of PET (polyethylene terephthalate) or the like, cut into a desired shape, and then released from the substrate to obtain green chips.

When a sheeting method is used, a green sheet is formed from a dielectric paste, an inner electrode material paste is printed onto the green sheet to prepare a laminate, and then the laminate is cut into a desired shape to obtain green chips.

The green chip thus obtained is then subjected to a binder-eliminating treatment. The binder-eliminating treatment can be achieved by keeping a green chip in the atmospheric air at a temperature of about 200–400° C. for about 0.5–24 hours.

In order to prevent oxidation of inner electrode, the product is sintered in an reductive atmosphere having an oxygen partial pressure of $10^{-8}$ to $10^{-12}$ atm for a predetermined period of time, preferably at a temperature not exceeding 1,300° C. and particularly at a temperature of 1,200 to 1,300° C., after which the product is heat-treated for the purpose of re-oxidizing the dielectric material in an atmosphere having an oxygen partial pressure of $10^{-5}$ to $10^{-8}$ atm, preferably at a temperature not exceeding 1,100° C. and particularly at a temperature of 800 to 1,100° C., whereby a sintered chip is obtained.

The sintered chip thus obtained is then subjected to an end surface grinding treatment by means of barrel or sand blast, and then an outer electrode paste is printed or transferred and baked to form outer electrodes. Preferably, the baking is carried out in a nitrogen gas atmosphere, at about 600–800° C., for about 0.1–1 hours. Preferably, a coating layer is formed on the surface of the outer electrodes by the method of plating.

EXAMPLES

Next, concrete examples of the present invention will be mentioned below to explain the invention in more detail.

EXAMPLE 1

As starting materials, $CaZrO_3$, $SrZrO_3$, $CaTiO_3$, $SrTiO_3$, $MnCO_3$, $Al_2O_3$, $BaCO_3$, $CaCO_3$, $SiO_2$ and oxides of Sc, Y, La, Ce, Pr, Nd, Sm, Eu, Gd, Tb, Dy, Ho, Er, Tm, Yb, Lu, Nb, Mo, Ta and W were prepared all in powdery form.

These materials were weighed out so as to give the final formulation shown in Table 1, mixed together in wetness, dehydrated, and dried to obtained the samples. As comparative sample, a sample containing lithium glass was prepared (No. 39), wherein the composition of glass was the same as in Table 5. A dielectric paste was prepared by adding 5.4% by weight of acrylic resin, 45% by weight of methylene chloride, 16% by weight of ethyl acetate, 6% by weight of mineral spirit and 4% by weight of acetone to 100% by weight of the starting material mixture for dielectric, and homogenizing them by means of ball mill. On the other hand, an inner electrode paste was prepared by kneading 100% by weight of nickel powder having a mean particle size of 0.8 $\mu$m together with 35% by weight of organic vehicle (8% by weight of ethyl cellulose resin dissolved in 92% by weight of butyl carbitol) and 7% by weight of butyl carbitol. Further, an outer electrode paste was prepared by kneading 100% by weight of copper powder having a mean particle size of 0.5 $\mu$m together with 35% by weight of organic vehicle (8% by weight of ethyl cellulose resin dissolved in 92% by weight of butyl carbitol) and 7% by weight of butyl carbitol.

First, a green sheet having a thickness of 7 $\mu$m was formed from the dielectric paste on a PET film, on which was printed the inner electrode paste, after which the sheet was peeled off from the PET film. A plurality of the sheets thus prepared were laminated and stacked together by means of a press to prepare a green laminate. The green laminate was cut into a prescribed size to obtain green chips. After a binder-eliminating treatment, sintering and annealing were carried out under the following conditions to obtain a sintered material of chip.

Binder-eliminating treatment: 280° C., 8 hours (in the air)

Sintering: 1,200–1,300° C., 2 hours, in an atmosphere of humidified mixture of $N_2$ and $H_2$, oxygen partial pressure $10^{-11}$ atm.

Annealing: 1,100° C., 3 hours, in an atmosphere of humidified $N_2$ gas, oxygen partial pressure $10^{-5}$ atm.

After grinding end surfaces of the sintered chip material thus obtained with sand blast, the outer electrode paste was transferred onto the end surfaces and fired in $N_2$ atmosphere at 800° C. for 30 minutes to form outer electrodes. Thus, a laminated ceramic condenser was obtained.

Each sample thus obtained had a size of 3.2×1.6×0.6 mm. Thickness of each dielectric layer was 5 $\mu$m. The number of dielectric layers was 4. Thickness of the internal electrodes was 2 $\mu$m.

TABLE 1

| Sample No. | Molar ratio in main component $[(Ca_XSr_{1-X})O]_m(Ti_YZr_{1-Y})O_2$ | | | | | Auxiliary component 1 (Mol % per 100 mol of main component) | | Glass component Molar ratio in $[(Ba_ZCa_{1-Z})O]_VSiO_2$ | | | Amount (mol %) | Auxiliary component 2 | Amount (mol %/100 mol of main component) |
|---|---|---|---|---|---|---|---|---|---|---|---|---|---|
| | X | 1 − X | Y | 1 − Y | m | MnO | $Al_2O_3$ | Z | 1 − Z | V | | Name | |
| 1 | 0.7 | 0.3 | 0.03 | 0.97 | 1.0 | 1.0 | 0.2 | 0.6 | 0.4 | 1.0 | 2.8 | — | — |
| 2 | 1.0 | 0 | 0 | 1.0 | 1.0 | 1.0 | 0.2 | 0.6 | 0.4 | 1.0 | 2.8 | — | — |
| 3 | 0.9 | 0.1 | 0.07 | 0.93 | 1.0 | 1.0 | 0.2 | 0.6 | 0.4 | 1.0 | 2.8 | — | — |
| 4 | 0.7 | 0.3 | 0.07 | 0.93 | 1.0 | 1.0 | 0.2 | 0.6 | 0.4 | 1.0 | 2.8 | — | — |
| 5 | 0.4 | 0.6 | 0 | 1.0 | 1.0 | 1.0 | 0.2 | 0.6 | 0.4 | 1.0 | 2.8 | — | — |
| 6 | 0.3 | 0.7 | 0.1 | 0.9 | 1.0 | 1.0 | 0.2 | 0.6 | 0.4 | 1.0 | 2.8 | — | — |
| 7 | 0.3 | 0.7 | 0.06 | 0.94 | 1.0 | 1.0 | 0.2 | 0.6 | 0.4 | 1.0 | 2.8 | — | — |
| 8 | 0.2 | 0.8 | 0 | 1.0 | 1.0 | 1.0 | 0.2 | 0.6 | 0.4 | 1.0 | 2.8 | — | — |
| 9* | 0.2 | 0.8 | 0.11* | 0.89 | 1.0 | 1.0 | 0.2 | 0.6 | 0.4 | 1.0 | 2.8 | — | — |
| 10 | 0 | 1.0 | 0.05 | 0.95 | 1.0 | 1.0 | 0.2 | 0.6 | 0.4 | 1.0 | 2.8 | — | — |
| 11 | 0.7 | 0.3 | 0.03 | 0.97 | 1.02 | 1.0 | 0.2 | 0.6 | 0.4 | 1.0 | 2.8 | — | — |
| 12 | 0.7 | 0.3 | 0.03 | 0.97 | 0.96 | 1.0 | 0.2 | 0.6 | 0.4 | 1.0 | 2.8 | — | — |
| 13* | 0.7 | 0.3 | 0.03 | 0.97 | 1.05* | 1.0 | 0.2 | 0.6 | 0.4 | 1.0 | 2.8 | — | — |
| 14 | 0.7 | 0.3 | 0.03 | 0.97 | 0.75 | 1.0 | 0.2 | 0.6 | 0.4 | 1.0 | 2.8 | — | — |
| 15* | 0.7 | 0.3 | 0.03 | 0.97 | 0.70* | 1.0 | 0.2 | 0.6 | 0.4 | 1.0 | 2.8 | — | — |
| 16 | 0.7 | 0.3 | 0.03 | 0.97 | 1.0 | 0.2 | 0.2 | 0.6 | 0.4 | 1.0 | 2.8 | — | — |
| 17 | 0.7 | 0.3 | 0.03 | 0.97 | 1.0 | 1.0 | 0.1 | 0.6 | 0.4 | 1.0 | 2.8 | — | — |
| 18 | 0.7 | 0.3 | 0.03 | 0.97 | 1.0 | 3.0 | 0.1 | 0.6 | 0.4 | 1.0 | 2.8 | — | — |
| 19* | 0.7 | 0.3 | 0.03 | 0.97 | 1.0 | 10* | 0.2 | 0.6 | 0.4 | 1.0 | 2.8 | — | — |
| 20* | 0.7 | 0.3 | 0.03 | 0.97 | 1.0 | 1.0 | 15* | 0.6 | 0.4 | 1.0 | 2.8 | — | — |
| 21 | 0.7 | 0.3 | 0.03 | 0.97 | 1.0 | 1.0 | 5.0 | 0.6 | 0.4 | 1.0 | 2.8 | — | — |
| 22* | 0.7 | 0.3 | 0.03 | 0.97 | 1.0 | 0* | 0.2 | 0.6 | 0.4 | 1.0 | 2.8 | — | — |
| 23* | 0.7 | 0.3 | 0.03 | 0.97 | 1.0 | 1.0 | 0* | 0.6 | 0.4 | 1.0 | 2.8 | — | — |
| 24 | 0.7 | 0.3 | 0.03 | 0.97 | 1.0 | 1.0 | 0.2 | 1.0 | 0 | 1.0 | 2.8 | — | — |
| 25 | 0.7 | 0.3 | 0.03 | 0.97 | 1.0 | 1.0 | 0.2 | 0 | 1.0 | 1.0 | 2.8 | — | — |
| 26 | 0.7 | 0.3 | 0.03 | 0.97 | 1.0 | 1.0 | 0.2 | 0.8 | 0.2 | 0.5 | 2.8 | — | — |
| 27* | 0.7 | 0.3 | 0.03 | 0.97 | 1.0 | 1.0 | 0.2 | 0.8 | 0.2 | 0.3* | 2.8 | — | — |
| 28 | 0.7 | 0.3 | 0.03 | 0.97 | 1.0 | 1.0 | 0.2 | 0.8 | 0.2 | 2.0 | 2.8 | — | — |
| 29* | 0.7 | 0.3 | 0.03 | 0.97 | 1.0 | 1.0 | 0.2 | 0.8 | 0.2 | 4.5* | 2.8 | — | — |
| 30 | 0.7 | 0.3 | 0.03 | 0.97 | 1.0 | 1.0 | 0.2 | 0.6 | 0.4 | 1.0 | 0.5 | — | — |

TABLE 1-continued

| Sample No. | Molar ratio in main component $[(Ca_xSr_{1-x})O]_m(Ti_yZr_{1-y})O_2$ | | | | | Auxiliary component 1 (Mol % per 100 mol of main component) | | Glass component Molar ratio in $[(Ba_zCa_{1-z})O]_vSiO_2$ | | | Amount | Auxiliary component 2 | Amount (mol %/100 mol of |
|---|---|---|---|---|---|---|---|---|---|---|---|---|---|
| | X | 1 − X | Y | 1 − Y | m | MnO | $Al_2O_3$ | Z | 1 − Z | V | (mol %) | Name | main component) |
| 31 | 0.7 | 0.3 | 0.03 | 0.97 | 1.0 | 1.0 | 0.2 | 0.6 | 0.4 | 1.0 | 15 | — | — |
| 32* | 0.7 | 0.3 | 0.03 | 0.97 | 1.0 | 1.0 | 0.2 | — | — | — | 0* | — | — |
| 33* | 0.7 | 0.3 | 0.03 | 0.97 | 1.0 | 1.0 | 0.2 | 0.6 | 0.4 | 1.0 | 22* | — | — |
| 34* | 0.7 | 0.3 | 0.03 | 0.97 | 1.0 | 1.0 | — | — | — | — | 0* | — | — |
| 35 | 0.7 | 0.3 | 0.03 | 0.97 | 1.0 | 1.0 | 0.2 | 0.6 | 0.4 | 1.0 | 2.8 | $CeO_2$ | 0.2 |
| 36* | 0.7 | 0.3 | 0.03 | 0.97 | 1.0 | 1.0 | 0.2 | 0.6 | 0.4 | 1.0 | 2.8 | $CeO_2$ | 2.0* |
| 37 | 0.7 | 0.3 | 0.03 | 0.97 | 1.0 | 1.0 | 0.2 | 0.6 | 0.4 | 1.0 | 2.8 | $WO_3$ | 0.2 |
| 38* | 0.7 | 0.3 | 0.03 | 0.97 | 1.0 | 1.0 | 0.2 | 0.6 | 0.4 | 1.0 | 2.8 | $WO_3$ | 2.0* |
| 39* | 0.7 | 0.3 | 0.03 | 0.97 | 1.0 | 1.0 | 0.2 | — | — | — | 0* | Li glass | 6.0 |
| 40* | 0.7 | 0.3 | 0.03 | 0.97 | 1.0 | 1.0 | 0.2 | — | — | — | 0* | $SiO_2$ | 2.8 |
| 41 | 0.7 | 0.3 | 0.03 | 0.97 | 1.0 | 1.0 | 0.2 | 0.6 | 0.4 | 1.0 | 2.8 | $ScO_{3/2}$ | 0.2 |
| 42* | 0.7 | 0.3 | 0.03 | 0.97 | 1.0 | 1.0 | 0.2 | 0.6 | 0.4 | 1.0 | 2.8 | $ScO_{3/2}$ | 2.0* |
| 43 | 0.7 | 0.3 | 0.03 | 0.97 | 1.0 | 1.0 | 0.2 | 0.6 | 0.4 | 1.0 | 2.8 | $YO_{3/2}$ | 0.2 |
| 44* | 0.7 | 0.3 | 0.03 | 0.97 | 1.0 | 1.0 | 0.2 | 0.6 | 0.4 | 1.0 | 2.8 | $YO_{3/2}$ | 2.0* |
| 45 | 0.7 | 0.3 | 0.03 | 0.97 | 1.0 | 1.0 | 0.2 | 0.6 | 0.4 | 1.0 | 2.8 | $LaO_{3/2}$ | 0.2 |
| 46* | 0.7 | 0.3 | 0.03 | 0.97 | 1.0 | 1.0 | 0.2 | 0.6 | 0.4 | 1.0 | 2.8 | $LaO_{3/2}$ | 2.0* |
| 47 | 0.7 | 0.3 | 0.03 | 0.97 | 1.0 | 1.0 | 0.2 | 0.6 | 0.4 | 1.0 | 2.8 | $PrO_{11/6}$ | 0.2 |
| 48* | 0.7 | 0.3 | 0.03 | 0.97 | 1.0 | 1.0 | 0.2 | 0.6 | 0.4 | 1.0 | 2.8 | $PrO_{11/6}$ | 2.0* |
| 49 | 0.7 | 0.3 | 0.03 | 0.97 | 1.0 | 1.0 | 0.2 | 0.6 | 0.4 | 1.0 | 2.8 | $NdO_{3/2}$ | 0.2 |
| 50* | 0.7 | 0.3 | 0.03 | 0.97 | 1.0 | 1.0 | 0.2 | 0.6 | 0.4 | 1.0 | 2:8 | $NdO_{3/2}$ | 2.0* |
| 51 | 0.7 | 0.3 | 0.03 | 0.97 | 1.0 | 1.0 | 0.2 | 0.6 | 0.4 | 1.0 | 2.8 | $SmO_{3/2}$ | 0.2 |
| 52* | 0.7 | 0.3 | 0.03 | 0.97 | 1.0 | 1.0 | 0.2 | 0.6 | 0.4 | 1.0 | 2.8 | $SmO_{3/2}$ | 2.0* |
| 53 | 0.7 | 0.3 | 0.03 | 0.97 | 1.0 | 1.0 | 0.2 | 0.6 | 0.4 | 1.0 | 2.8 | $EuO_{3/2}$ | 0.2 |
| 54* | 0.7 | 0.3 | 0.03 | 0.97 | 1.0 | 1.0 | 0.2 | 0.6 | 0.4 | 1.0 | 2.8 | $EuO_{3/2}$ | 2.0* |
| 55 | 0.7 | 0.3 | 0.03 | 0.97 | 1.0 | 1.0 | 0.2 | 0.6 | 0.4 | 1.0 | 2.8 | $GdO_{3/2}$ | 0.2 |
| 56* | 0.7 | 0.3 | 0.03 | 0.97 | 1.0 | 1.0 | 0.2 | 0.6 | 0.4 | 1.0 | 2.8 | $GdO_{3/2}$ | 2.0* |
| 57 | 0.7 | 0.3 | 0.03. | 0.97 | 1.0 | 1.0 | 0.2 | 0.6 | 0.4 | 1.0 | 2.8 | $TbO_{3/2}$ | 0.2 |
| 58* | 0.7 | 0.3 | 0.03 | 0.97 | 1.0 | 1.0 | 0.2 | 0.6 | 0.4 | 1.0 | 2.8 | $TbO_{3/2}$ | 2.0* |
| 59 | 0.7 | 0.3 | 0.03 | 0.97 | 1.0 | 1.0 | 0.2 | 0.6 | 0.4 | 1.0 | 2.8 | $DyO_{3/2}$ | 0.2 |
| 60* | 0.7 | 0.3 | 0.03 | 0.97 | 1.0 | 1.0 | 0.2 | 0.6 | 0.4 | 1.0 | 2.8 | $DyO_{3/2}$ | 2.0* |
| 61 | 0.7 | 0.3 | 0.03 | 0.97 | 1.0 | 1.0 | 0.2 | 0.6 | 0.4 | 1.0 | 2.8 | $HoO_{3/2}$ | 0.2 |
| 62* | 0.7 | 0.3 | 0.03 | 0.97 | 1.0 | 1.0 | 0.2 | 0.6 | 0.4 | 1.0 | 2.8 | $HoO_{3/2}$ | 2.0* |
| 63 | 0.7 | 0.3 | 0.03 | 0.97 | 1.0 | 1.0 | 0.2 | 0.6 | 0.4 | 1.0 | 2.8 | $ErO_{3/2}$ | 0.2 |
| 64* | 0.7 | 0.3 | 0.03 | 0.97 | 1.0 | 1.0 | 0.2 | 0.6 | 0.4 | 1.0 | 2.8 | $ErO_{3/2}$ | 2.0* |
| 65 | 0.7 | 0.3 | 0.03 | 0.97 | 1.0 | 1.0 | 0.2 | 0.6 | 0.4 | 1.0 | 2.8 | $TmO_{3/2}$ | 0.2 |
| 66* | 0.7 | 0.3 | 0.03 | 0.97 | 1.0 | 1.0 | 0.2 | 0.6 | 0.4 | 1.0 | 2.8 | $TmO_{3/2}$ | 2.0* |
| 67 | 0.7 | 0.3 | 0.03 | 0.97 | 1.0 | 1.0 | 0.2 | 0.6 | 0.4 | 1.0 | 2.8 | $YbO_{3/2}$ | 0.2 |
| 68* | 0.7 | 0.3 | 0.03 | 0.97 | 1.0 | 1.0 | 0.2 | 0.6 | 0.4 | 1.0 | 2.8 | $YbO_{3/2}$ | 2.0* |
| 69 | 0.7 | 0.3 | 0.03 | 0.97 | 1.0 | 1.0 | 0.2 | 0.6 | 0.4 | 1.0 | 2.8 | $LuO_{3/2}$ | 0.2 |
| 70* | 0.7 | 0.3 | 0.03 | 0.97 | 1.0 | 1.0 | 0.2 | 0.6 | 0.4 | 1.0 | 2.8 | $LuO_{3/2}$ | 2.0* |
| 71 | 0.7 | 0.3 | 0.03 | 0.97 | 1.0 | 1.0 | 0.2 | 0.6 | 0.4 | 1.0 | 2.8 | $NbO_{5/2}$ | 0.2 |
| 72* | 0.7 | 0.3 | 0.03 | 0.97 | 1.0 | 1.0 | 0.2 | 0.6 | 0.4 | 1.0 | 2.8 | $NbO_{5/2}$ | 3.0* |
| 73 | 0.7 | 0.3 | 0.03 | 0.97 | 1.0 | 1.0 | 0.2 | 0.6 | 0.4 | 1.0 | 2.8 | $TaO_{5/2}$ | 0.2 |
| 74* | 0.7 | 0.3 | 0.03 | 0.97 | 1.0 | 1.0 | 0.2 | 0.6 | 0.4 | 1.0 | 2.8 | $TaO_{5/2}$ | 2.0* |
| 75 | 0.7 | 0.3 | 0.03 | 0.97 | 1.0 | 1.0 | 0.2 | 0.6 | 0.4 | 1.0 | 2.8 | $MoO_3$ | 0.2 |
| 76* | 0.7 | 0.3 | 0.03 | 0.97 | 1.0 | 1.0 | 0.2 | 0.6 | 0.4 | 1.0 | 2.8 | $MoO_3$ | 2.0* |

*Outside the scope of the present invention (including outside preferable range)

Next, on the condensers thus obtained, dielectric constant $\in$, specific resistance $\rho$ ($\Omega$cm), temperature coefficient of capacitance $\tau C$ (ppm/° C.), capacitance change rate $\Delta C/C$ (ppm/° C.) and accelerated lifetime (h) of insulating resistance (IR) were measured.

Dielectric constant $\in$ was measured at 1 KHz, 1 Vrms, 25° C. Temperature coefficient of capacitance $\tau C$ was calculated from the following equation:

$$\tau C (ppm/° C.) = \{(C125 - C25)/C25\} \times \{1/(125-25)\} \times 10^6$$

wherein C125 and C25 are capacitance at 1 MHz at 125° C. and at 25° C., respectively.

Specific resistance $\rho$ ($\Omega$cm) was determined from resistance after applying DC 50V for 60 seconds at 25° C. Capacitance change rate $\Delta C/C$ (ppm/° C.) was determined from the capacitance at 100 Hz at 125° C., taking temperature response of capacitance at 1 MHz at 25° C. as standard. Accelerated lifetime of insulating resistance (IR) was determined by carrying out an acceleration test at 200° C. under a direct current field of 70 V/$\mu$m and measuring the period of time required for reaching a resistance (IR) of $2 \times 10^5$ $\Omega$ or less. Mean grain diameter of crystal was determined by chemically etching or thermally etching a ground surface of dielectric layer and then analyzing the scanning electron microscopic image. The results are shown in Table 2.

TABLE 2

| Sample No. | Sintering temperature T (° C.) | Dielectric constant ε | Specific resistance ρ(Ω cm) | Temperature coefficient of capacitance τC (ppm/° C.) | Capacitance change rate ΔC/C(ppm/° C.) | Accelerated lifetime (h) | Mean grain size of crystal (μm) |
|---|---|---|---|---|---|---|---|
| 1 | 1300 | 36 | $3.1 \times 10^{14}$ | +5 | +7 | >450 | 1.0 |
| 2 | 1300 | 33 | $4.0 \times 10^{14}$ | +3 | +9 | 270 | 0.5 |
| 3 | 1300 | 44 | $3.0 \times 10^{15}$ | −83 | −70 | >450 | 0.8 |
| 4 | 1300 | 44 | $5.0 \times 10^{15}$ | −66 | −50 | 289 | 1.0 |
| 5 | 1260 | 37 | $9.0 \times 10^{14}$ | +104 | +119 | 306 | 1.4 |
| 6 | 1220 | 45 | $1.4 \times 10^{14}$ | −128 | −120 | 315 | 1.0 |
| 7 | 1220 | 44 | $2.3 \times 10^{14}$ | −7 | +3 | 309 | 1.0 |
| 8 | 1260 | 36 | $2.0 \times 10^{15}$ | +137 | +145 | 273 | 1.9 |
| 9* | 1260 | 43 | $1.0 \times 10^{15}$ | −119 | −85* | 284 | 1.8 |
| 10 | 1300 | 40 | $3.8 \times 10^{13}$ | +20 | +39 | 260 | 2.3 |
| 11 | 1300 | 38 | $3.6 \times 10^{13}$ | +9 | +10 | 263 | 1.0 |
| 12 | 1300 | 36 | $1.3 \times 10^{14}$ | +11 | +18 | 377 | 1.0 |
| 13* | No dense sintered product obtained below 1,300 ° C. | | | | | | — |
| 14 | 1300 | 38 | $4.0 \times 10^{14}$ | +95 | +123 | 244 | 1.6 |
| 15* | 1300 | 35 | $6.0 \times 10^{14}$ | +105 | +148* | 346 | 1.3 |
| 16 | 1300 | 34 | $3.0 \times 10^{15}$ | +2 | +20 | 390 | 1.0 |
| 17 | 1300 | 36 | $2.5 \times 10^{14}$ | +3 | +5 | 288 | 1.3 |
| 18 | 1300 | 37 | $2.3 \times 10^{14}$ | +20 | +39 | 379 | 1.2 |
| 19* | 1260 | 38 | $1.3 \times 10^{15}$ | +38 | +716* | 118 | 1.5 |
| 20* | 1300 | 27 | $8.3 \times 10^{14}$ | +35 | +45 | 85* | 1.6 |
| 21 | 1260 | 33 | $8.0 \times 10^{14}$ | +2 | +4 | 242 | 1.0 |
| 22* | No dense sintered product obtained below 1,300° C. | | | | | | — |
| 23* | No dense sintered product obtained below 1,300° C. | | | | | | — |
| 24 | 1300 | 35 | $7.7 \times 10^{14}$ | +2 | +10 | 380 | 1.4 |
| 25 | 1300 | 34 | $2.2 \times 10^{14}$ | +11 | +15 | >450 | 0.8 |
| 26 | 1300 | 36 | $1.9 \times 10^{15}$ | −2 | +3 | 168 | 0.9 |
| 27* | 1300 | 35 | $8.3 \times 10^{14}$ | +18 | +30 | 71* | 1.9 |
| 28 | 1300 | 34 | $1.5 \times 10^{14}$ | +4 | +13 | 263 | 1.3 |
| 29* | No dense sintered product obtained below 1,300° C. | | | | | | — |
| 30 | 1300 | 38 | $2.8 \times 10^{13}$ | +10 | +16 | 410 | 0.8 |
| 31 | 1300 | 29 | $1.2 \times 10^{14}$ | +16 | +23 | 210 | 1.8 |
| 32* | No dense sintered product obtained below 1,300° C. | | | | | | — |
| 33* | No dense sintered product obtained below 1,300° C. | | | | | | — |
| 34* | No dense sintered product obtained below 1,300° C. | | | | | | — |
| 35 | 1300 | 33 | $2.0 \times 10^{15}$ | +8 | +16 | >450 | 1.1 |
| 36* | No dense sintered product obtained below 1,300° C. | | | | | | — |
| 37 | 1300 | 32 | $6.0 \times 10^{14}$ | +10 | +25 | >450 | 0.9 |
| 38* | No dense sintered product obtained below 1,300° C. | | | | | | — |
| 39* | 1200 | 34 | $3.3 \times 10^{14}$ | −4 | +20 | 68* | 0.8 |
| 40* | 1300 | 35 | $9.0 \times 10^{14}$ | +8 | +45 | 41* | 1.3 |
| 41 | 1300 | 35 | $9.9 \times 10^{14}$ | +3 | +10 | >450 | 0.9 |
| 42* | No dense sintered product obtained below 1,300° C. | | | | | | — |
| 43 | 1300 | 29 | $1.2 \times 10^{15}$ | +15 | +23 | >450 | 1.2 |
| 44* | No dense sintered product obtained below 1,300° C. | | | | | | — |
| 45 | 1300 | 34 | $1.7 \times 10^{15}$ | +18 | +22 | >450 | 1.4 |
| 46* | No dense sintered product obtained below 1,300° C. | | | | | | — |
| 47 | 1300 | 32 | $1.1 \times 10^{15}$ | +3 | +9 | >450 | 0.9 |
| 48* | No dense sintered product obtained below 1,300° C. | | | | | | — |
| 49 | 1300 | 32 | $2.3 \times 10^{15}$ | +11 | +19 | >450 | 1.0 |
| 50* | No dense sintered product obtained below 1,300° C. | | | | | | — |
| 51 | 1300 | 36 | $1.2 \times 10^{15}$ | +1 | +10 | >450 | 1.3 |
| 52* | No dense sintered product obtained below 1,300° C. | | | | | | — |
| 53 | 1300 | 33 | $1.8 \times 10^{15}$ | +12 | +18 | >450 | 0.9 |
| 54* | No dense sintered product obtained below 1,300° C. | | | | | | — |
| 55 | 1300 | 31 | $1.9 \times 10^{15}$ | +14 | +22 | >450 | 0.8 |
| 56* | No dense sintered product obtained below 1,300° C. | | | | | | — |
| 57 | 1300 | 28 | $2.1 \times 10^{15}$ | +10 | +13 | >450 | 0.8 |
| 58* | No dense sintered product obtained below 1,300° C. | | | | | | — |
| 59 | 1300 | 30 | $1.6 \times 10^{15}$ | +5 | +15 | >450 | 1.1 |
| 60* | No dense sintered product obtained below 1,300° C. | | | | | | — |
| 61 | 1300 | 35 | $1.6 \times 10^{15}$ | +11 | +19 | >450 | 1.2 |
| 62* | No dense sintered product obtained below 1,300° C. | | | | | | — |
| 63 | 1300 | 34 | $1.1 \times 10^{15}$ | +2 | +11 | >450 | 0.8 |
| 64* | No dense sintered product obtained below 1,300° C. | | | | | | — |
| 65 | 1300 | 31 | $1.4 \times 10^{15}$ | +8 | +13 | >450 | 0.7 |
| 66* | No dense sintered product obtained below 1,300° C. | | | | | | — |
| 67 | 1300 | 32 | $1.8 \times 10^{15}$ | +16 | +19 | >450 | 0.9 |
| 68* | No dense sintered product obtained below 1,300° C. | | | | | | — |
| 69 | 1300 | 30 | $2.1 \times 10^{15}$ | +5 | +8 | >450 | 1.0 |
| 70* | No dense sintered product obtained below 1,300° C. | | | | | | — |
| 71 | 1300 | 29 | $4.0 \times 10^{14}$ | +8 | +11 | >450 | 0.9 |
| 72* | No dense sintered product obtained below 1,300° C. | | | | | | — |
| 73 | 1300 | 31 | $6.7 \times 10^{13}$ | +6 | +10 | >450 | 1.3 |

TABLE 2-continued

| Sample No. | Sintering temperature T (° C.) | Dielectric constant ε | Specific resistance ρ(Ω cm) | Temperature coefficient of capacitance τC (ppm/° C.) | Capacitance change rate ΔC/C(ppm/° C.) | Accelerated lifetime (h) | Mean grain size of crystal (μm) |
|---|---|---|---|---|---|---|---|
| 74* | No dense sintered product obtained below 1,300° C. | | | | | | — |
| 75 | 1300 | 34 | 6.1 × 10¹⁴ | +11 | +17 | >450 | 1.1 |
| 76* | No dense sintered product obtained below 1,300° C. | | | | | | — |

*Outside the scope of the present invention, including outside the preferable range Table 2 illustrates the results of the present invention. Thus, condensers using the dielectric ceramic composition of the present invention have a specific resistance of no less than 1×10¹³ Ωcm and a small temperature coefficient of capacitance [difference between temperature coefficient of capacitance at 1 MHz and capacitance change rate at 100 Hz at 125° C. based on that measured at 1 MHz at 25° C. is no more than 30 ppm/° C.]. Further, accelerated lifetime of insulating resistance is as long as no less than 120 hours, and particularly no more and 200 hours.

EXAMPLE 2

Samples were prepared by adding Ce oxide or Ta oxide, as a minute additive, to the Sample No. 1 prepared in Example 1 (referred to as STD in the drawing) in an amount of 0.2 mol %, respectively, calculated as $CeO_2$ or $TaO_{5/2}$. Dielectric loss tangents of the samples thus obtained were measured at 100 Hz in the temperature range of 20 to 160° C. The graph of FIG. 1 illustrates the results. It is apparent from FIG. 1 that, in the samples containing Ta oxide or Ce oxide, the elevation of dielectric loss tangent in the high temperature region is suppressed as compared with the elevation in Sample No. 1 (STD). It was also confirmed that other minute additives (oxides of Sc, Y, La, Pr, Nd, Pm, Sm, Eu, Gd, Tb, Dy, Ho, Er, Tm, Yb, Lu, Nb, Mo and W) exhibit a similar effect.

EXAMPLE 3

Figure 2:
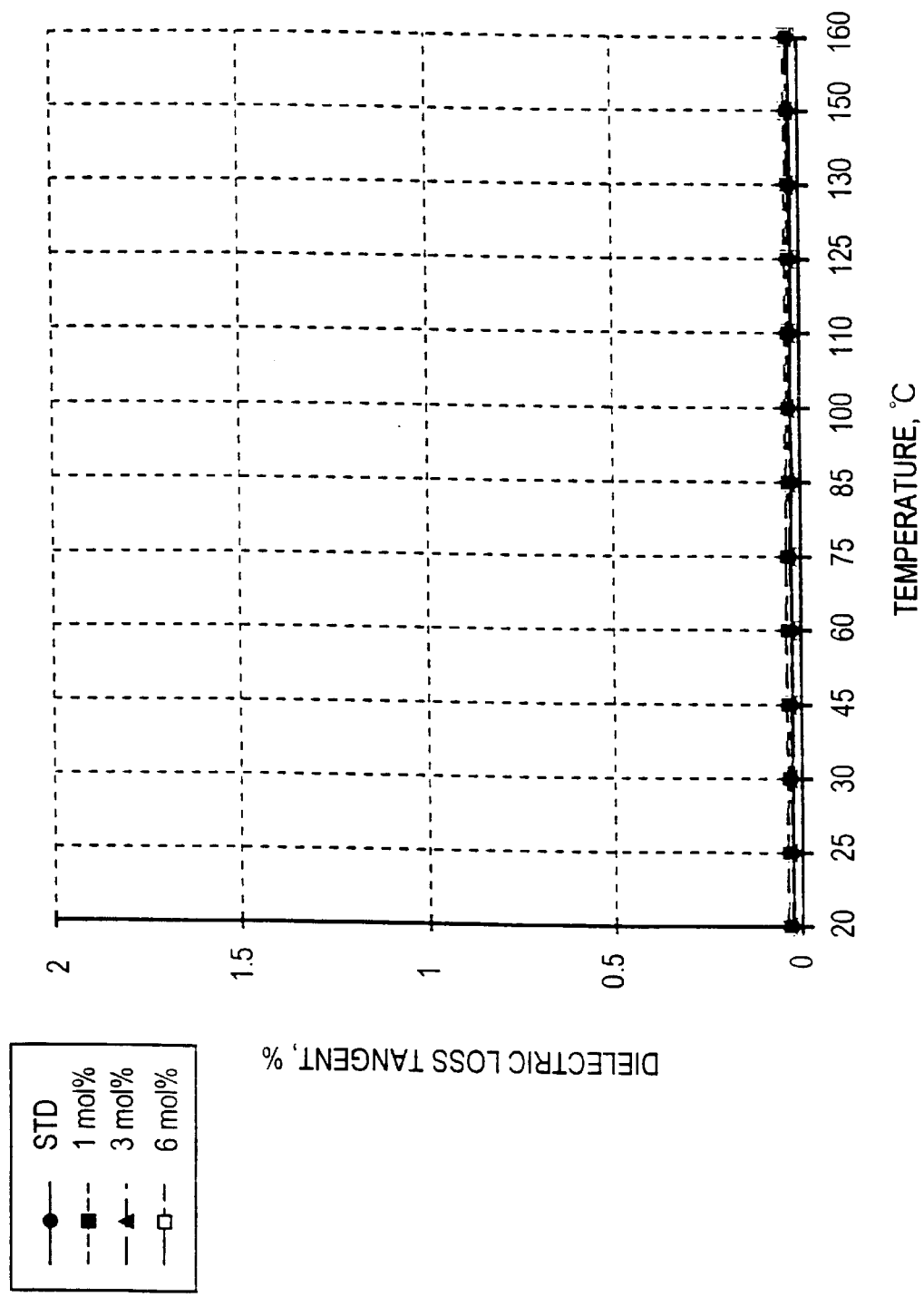
FIG. 2 is a graph illustrating the effect of addition of Li at 1 MHz.
Figure 3:
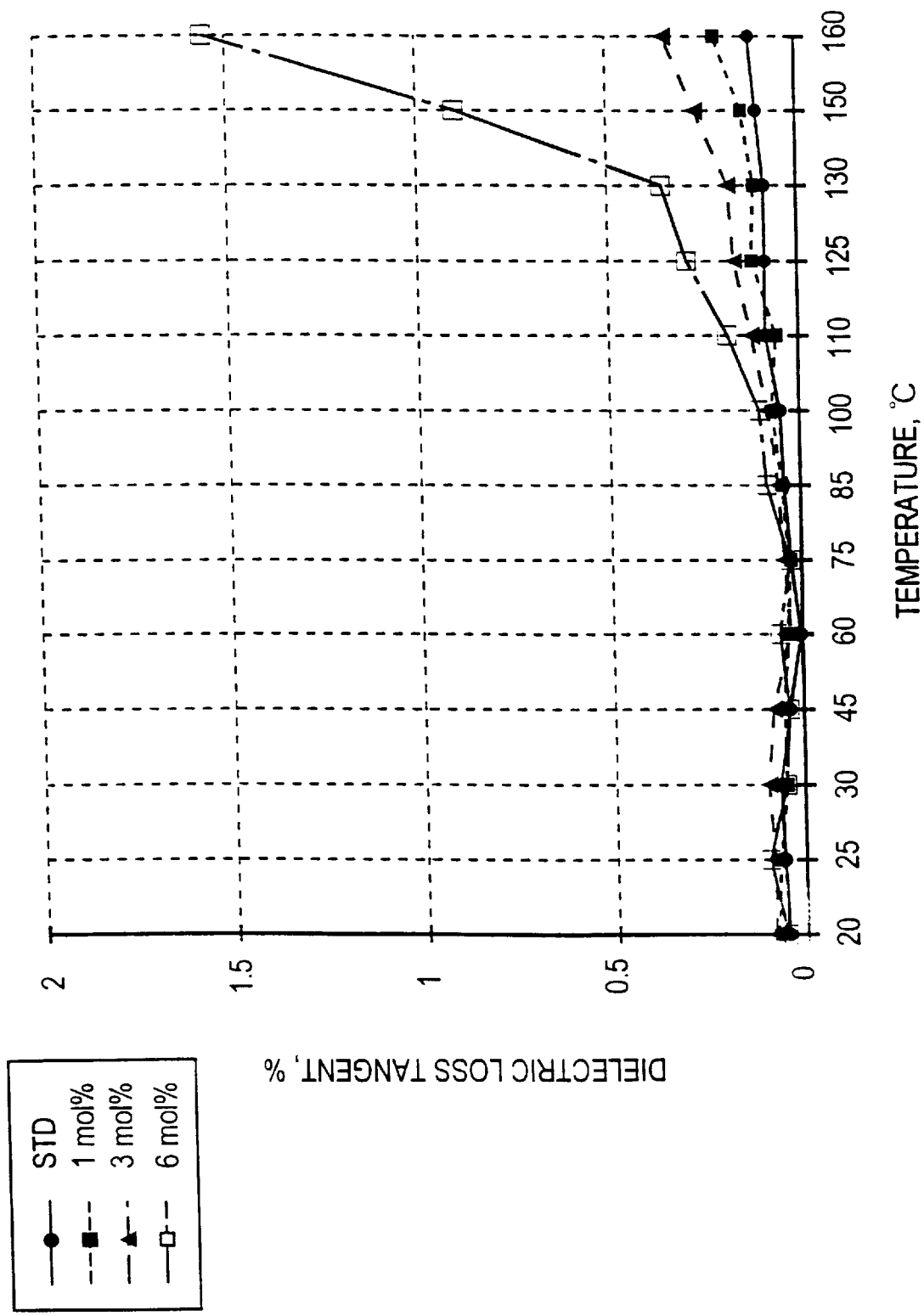
FIG. 3 is a graph illustrating the effect of addition of Li at 100 Hz.

Samples were prepared by adding, as minute additive, the Li glass shown in Table 3 in an amount of 1.0, 3.0 or 6.0 mol %, respectively, calculated as $LiO_{1/2}$, to sample No. 30 prepared in Example 1 (referred to as STD in the drawing). On each sample, dielectric loss tangents at 1 MHz and 100 Hz were measured in the temperature range of 20 to 160° C. FIGS. 2 and 3 illustrates the results thus obtained. It is apparent from FIGS. 2 and 3 that a larger quantity of Li added brings about a more marked increase in dielectric loss tangent in high temperature region at a low frequency of 100 Hz, though the effect of addition of Li ion is not noticeable at a high frequency of 1 MHz.

TABLE 3

| | (Li glass) | | | | | | | |
|---|---|---|---|---|---|---|---|---|
| Constituent | Li₂O | MgO | CaO | SrO | BaO | SiO₂ | TiO₂ | Al₂O₃ |
| Molar ratio | 25 | 2 | 6 | 6 | 6 | 48 | 5 | 2 |

EXAMPLE 4

From the samples used in Example 1, Sample Nos. 5, 7 and 8 were selected, and these samples were sintered at varied sintering temperatures in order to investigate the influence of crystal grain size. Thus, Samples No. 5 and No. 8 were sintered at 1,260° C. and at 1,300° C. and Sample No. 7 was sintered at 1,220° C., 1,260° C. and 1,300° C. to prepare samples different in crystal grain size. These samples were tested in the same manner as in Example 1 to obtain the results shown in Table 4.

TABLE 4

| Sample No. | Sintering temperature T (° C.) | Mean grain size of crystal (μm) | Dielectric constant ε | Specific resistance ρ(Ω cm) | Temperature coefficient of capacitance τC(ppm/° C.) | Capacitance change rate ΔC/C(ppm/° C.) | Accelerated lifetime (h) |
|---|---|---|---|---|---|---|---|
| 5 | 1260 | 1.4 | 37 | 9.0 × 10¹⁴ | +104 | +119 | 306 |
| 5 | 1300 | 4.5* | 38 | 1.0 × 10¹⁵ | +101 | +128 | 37* |
| 7 | 1220 | 1.0 | 45 | 2.3 × 10¹⁴ | −7 | +3 | 309 |
| 7 | 1260 | 2.5 | 44 | 5.0 × 10¹⁴ | −5 | +4 | 220 |
| 7 | 1300 | 8.0* | 52 | 6.5 × 10¹⁴ | −8 | +10 | 18* |
| 8 | 1260 | 1.9 | 36 | 2.0 × 10¹⁵ | +137 | +145 | 273 |
| 8 | 1300 | 6.0* | 39 | 9.0 × 10¹⁴ | +140 | +156 | 43* |

*Outside the scope of the present invention

It is apparent from Table 4 that the accelerated lifetime of IR is low in the samples of which crystal grain size exceeds 3 μm.

EFFECT OF THE INVENTION

As has been mentioned above, according to the present invention, a base metal such as Ni is used as inner electrode of laminated ceramic condenser. Thus, there can be obtained a non-reductive ceramic material capable of being sintered at a temperature not exceeding 1,300° C., showing a small temperature coefficient of capacitance, arbitrarily controllable in the range of −150 to +150 ppm/° C., having a specific resistance at 25° C. of no less than 1×10¹³ Ωcm, small in the frequency-dependence of dielectric constant and dielectric loss tangent (tan δ), and long in the accelerated lifetime of insulating resistance.

We claim:

1. A non-reductive dielectric ceramic material comprising a main component and auxiliary components, wherein when said main component is represented by the following formula:

$$[(Ca_XSr_{1-X})O]_m[(Ti_YZr_{1-Y})O_2]$$

X, Y and m are in the following ranges:

$0 \leq X \leq 1$, $0 \leq Y \leq 0.10$, and $0.75 \leq m \leq 1.04$ and said auxiliary components are 0.2 to 5 mol % Mn oxide per said main component, calculated as MnO, 0.1 to 10 mol % Al oxide per said main component, calculated as $Al_2O_3$, and of a component 0.5 to 15 mol % per said main component represented by the following formula:

$$[(Ba_ZCa_{1-Z})O]_VSiO_2$$

in which Z and V are in the following ranges:

$0 \leq Z \leq 1$, and $0.5 \leq V \leq 4.0$.

2. The non-reductive dielectric ceramic material of claim 1, which further contains at least one oxide of La, Ce, Pr, Nd, Sm, Eu, Gd, Tb, Dy, Ho, Er, Tm, Yb, Lu, Sc, Y or Nb, Mo, Ta or W in an amount of 0.02 to 1.5 mol %.

3. The non-reductive dielectric ceramic material of claim 1, which has been sintered at a sintering temperature of not higher than 1,300° C.

4. The non-reductive dielectric ceramic material of claim 1, and having a mean crystal grain diameter of not greater than 3 μm.

5. A laminated ceramic condenser having the non-reductive dielectric ceramic material of claim 1 as a dielectric material.

6. The laminated ceramic condenser of claim 5, wherein the difference between temperature coefficient τC of capacitance determined from C25 (capacitance at 25° C. at 1 MHz) and C125 (capacitance at 125° C. at 1 MHz) according to:

$$\tau C(ppm/° C.) = \{(C125-C25)/C25\} \times \{1/(125-25)\} \times 10^6$$

and capacitance change rate ΔC/C (ppm/° C.) determined from the capacitance change rate at 125° C. at 100 Hz based on a temperature response of capacitance at 1 MHz at 25° C. is within ±30.

7. The laminated ceramic condenser of claim 5, and having an accelerated lifetime until insulating resistance (IR) reaches $2 \times 10^5 \Omega$ or less under a direct current electric field of 70V/μm at 200° C. of no less than 100 hours.

8. The laminated ceramic condenser of claim 5, which has an inner conductor containing at least nickel.

* * * * *

UNITED STATES PATENT AND TRADEMARK OFFICE
CERTIFICATE OF CORRECTION

PATENT NO. : 6,118,648
DATED : September 12, 2000
INVENTOR(S) : Takashi Kojima, et al.

It is certified that error appears in the above-identified patent and that said Letters Patent is hereby corrected as shown below:

<u>Column 15,</u>
Line 19, "$Al_3O_3$" should read -- $Al_2O_3$ --.

Signed and Sealed this

Sixteenth Day of October, 2001

Attest:

NICHOLAS P. GODICI
*Attesting Officer*   *Acting Director of the United States Patent and Trademark Office*